(12) United States Patent
Gotou

(10) Patent No.: US 7,381,352 B2
(45) Date of Patent: Jun. 3, 2008

(54) DISPERSION OF THIN PARTICLES HAVING A SKELETON CONSISTING OF CARBONS

(75) Inventor: Takuya Gotou, Tsukuba (JP)

(73) Assignee: Mitsubishi Gas Chemical Company, Inc. (JP)

(*) Notice: Subject to any disclaimer, the term of this patent is extended or adjusted under 35 U.S.C. 154(b) by 476 days.

(21) Appl. No.: 10/897,088

(22) Filed: Jul. 23, 2004

(65) Prior Publication Data

US 2005/0020759 A1 Jan. 27, 2005

(30) Foreign Application Priority Data

Jul. 23, 2003 (JP) ............................. 2003-278180

(51) Int. Cl.
*H01B 1/04* (2006.01)
*C01B 31/04* (2006.01)

(52) U.S. Cl. ...................................... 252/502; 423/448

(58) Field of Classification Search ................ 252/500, 252/502; 423/448
See application file for complete search history.

(56) References Cited

U.S. PATENT DOCUMENTS

| | | | | |
|---|---|---|---|---|
| 5,853,877 A | * | 12/1998 | Shibuta | ...................... 428/357 |
| 6,149,972 A | * | 11/2000 | Greinke | ....................... 427/220 |
| 6,440,331 B1 | * | 8/2002 | Carano et al. | ............... 252/506 |
| 6,596,396 B2 | * | 7/2003 | Hirata et al. | ................. 428/402 |
| 6,669,919 B1 | * | 12/2003 | Greinke | ....................... 423/448 |
| 6,828,015 B2 | * | 12/2004 | Hirata et al. | ................. 428/323 |
| 6,872,330 B2 | * | 3/2005 | Mack et al. | ............. 252/378 R |
| 6,974,551 B2 | * | 12/2005 | Zaghib et al. | ................. 252/70 |
| 7,105,108 B2 | * | 9/2006 | Kaschak et al. | ......... 252/378 R |
| 2002/0022122 A1 | * | 2/2002 | Hirata et al. | ................. 428/220 |

FOREIGN PATENT DOCUMENTS

JP 2002-053313 2/2002
WO WO 02/28981 A1 * 11/2002

OTHER PUBLICATIONS

Plastics, vol. 53, No. 7, pp. 46-55 (2002) (w/Partial Translation).

* cited by examiner

*Primary Examiner*—Lorna M. Douyon
*Assistant Examiner*—Jaison Thomas
(74) *Attorney, Agent, or Firm*—Dickstein, Shapiro, LLP.

(57) ABSTRACT

The invention provides a dispersion of thin particles using a specific solvent which can disperse thin particles having a skeleton consisting of carbons obtained by oxidizing graphite and dispersible in a liquid having a relative dielectric constant of 15 or more and which can dissolve a large number of polymeric materials.

12 Claims, No Drawings

DISPERSION OF THIN PARTICLES HAVING A SKELETON CONSISTING OF CARBONS

FIELD OF THE INVENTION

The present invention relates to a dispersion of thin particles having a skeleton consisting of carbons.

RELATED ART

With respect to thin particles having a skeleton consisting of carbons used in the present invention, which are obtained by oxidizing graphite and dispersible in a liquid having a relative dielectric constant of 15 or more (also referred to hereinafter as "the thin particles"), there are the following known features and features disclosed by the present inventors.

As two-dimensional anisotropic substance having a skeleton of carbon atoms, there is graphite oxide obtained by oxidizing graphite. This graphite oxide is a multi-layer structure having two-dimensional basic layers laminated therein, and a multi-layer structure wherein the number of layers is very large is generally known. On the other hand, a very thin multi-layer structure wherein the number of layers is low has been also produced (see, for example, N. A. Kotov et al., Ultrathin Graphite Oxide-Polyelectrolyte Composites Prepared by Self-Assembly: Transition Between Conductive and Non-Conductive States, Adv. Mater., 8, 637 (1996)). The present inventors previously found a process for producing such thin particles of graphite oxide in high yield (graphite oxide wherein the number of layer is 1 is desirably called graphen oxide for example (graphen is a name of one layer of graphite)), and reduced the thin particles of graphite oxide to obtain thin particles resembling graphite wherein the number of layers is very small (graphite wherein the number of layer is 1 is desirably called graphen) (see JP-A 2002-53313 and JP-A 2003-176116).

The basic layer of graphite oxide is considered to have a structure consisting of a carbon skeleton having the thickness of one or two carbon atoms (consisting of $sp^3$ carbon and $sp^2$ carbon, often $sp^3$ carbon) and acidic hydroxyl groups etc. bound to both sides of the skeleton (see, for example, T. Nakajima et al., A NEW STRUCTURE MODEL OF GRAPHITE OXIDE, Carbon, 26, 357 (1988), and M. Mermoux et al., FTIR AND $^{13}$C NMR STUDY OF GRAPHITE OXIDE, Carbon, 29, 469 (1991)). When the carbon skeleton has the thickness of one carbon atom and has hydroxyl groups etc. in both sides thereof with a very small amount of interlaminar water, the thickness of the basic layer is 0.61 nm. When graphite is highly oxidized and well dried, the oxygen content in the graphite oxide is about 40 wt %.

It is known that the thin particles of graphite oxide are partially or completely reduced thereby assuming an electronic state having increased $sp^2$ bonds similar to the state of graphite, to increase electrical conductivity. Graphite oxide having increased electrical conductivity by reduction can be utilized in various fields such as semiconductor elements, wire materials and antistatic fillers as semiconductors or conductors, and is very useful.

After synthesis of graphite oxide is finished, the dispersing medium in the dispersion is usually water, and this dispersing medium can be changed from water to a highly polar, non-water liquid having a relative dielectric constant of 15 or more, such as methanol, ethanol, acetone or 2-butanone. As a means of exchanging the dispersing medium with a dispersing medium based on a highly polar, non-water liquid, there is a method of diluting the original dispersion with a highly polar, non-water liquid in a sufficiently larger amount than water contained in the dispersion, or a method of exchanging the dispersing medium gradually with a highly polar, non-water dispersing medium by repeatedly conducting addition of a highly polar, non-water liquid and subsequent removal of a supernatant by centrifugation and decantation. A liquid wherein several kinds of liquids are mixed in a suitable ratio can also be used as the dispersing medium. In this case, a liquid having a relative dielectric constant of less than 15 may be partially used.

As described above, the dispersing medium used in a dispersion of the thin particles having a skeleton consisting of carbons, which are obtained by oxidizing graphite and dispersible in a liquid having a relative dielectric constant of 15 or more, is not limited to water and can be suitably selected. For example, the original dispersing medium can be changed from water to ethanol (relative dielectric constant 23.8) by repeatedly conducting centrifugation and decantation, as described above. A liquid having a relative dielectric constant of less than 15 can also be partially used. However, when the proportion of the liquid having a relative dielectric constant of less than 15 is 50 wt % or more, aggregation of the thin particles is initiated, and thus there is a certain limit to the proportion of the liquid having a relative dielectric constant of less than 15.

The present inventors have confirmed the effect of a thin particle/polymeric material composite on improvement in gas barrier properties and improvement in electrical conductivity (see JP-A 2003-231098). Further, the thin particles are highly anisotropic in shape and can thus be expected to exhibit a significant effect when used as a composite material.

A process for producing a thin particle/polymeric material composite (composite material) easily and effectively can be realized when the polymeric material used is soluble in a dispersing medium having the thin particles dispersed therein. In this case, a polymeric composite material using the thin particles can be produced easily by mixing a dispersion of the thin particles with the polymeric material and then removing the dispersing medium. This process is simple and allows the polymeric material to be mixed uniformly with the thin particles in the dispersion thus enabling production of a polymeric composite material having the thin particles dispersed highly therein. It is very important to disperse the thin particles highly in the composite material, and by highly dispersing the thin particles, their maximum effect can be achieved. Even in a composite material using carbon nanotubes attracting attention as nano-material in recent years, it is difficult to disperse the carbon nanotubes highly in the composite material, and the superiority of the above-described process for producing the composite can be appreciated (see Plastic, Vol. 53, No. 7, 46 (2002)).

When the above-described process for producing the composite is used, the polymeric material which can be selected is limited depending on the type of dispersing medium. However, the amount of a liquid having a relative dielectric constant of less than 15 is limited to less than 50 wt % in order to prevent the thin particles from being aggregated, and thus the above process for producing the composite cannot be applied to industrially important polymeric materials such as polycarbonate resin and polystyrene resin. Accordingly, there is a strong demand for a solvent capable of solubilizing a larger number of polymeric materials and serving as a dispersing medium for the thin particles.

SUMMARY OF THE INVENTION

In the present invention, it is desired to provide a dispersion of thin particles using a specific solvent which can disperse thin particles having a skeleton consisting of carbons obtained by oxidizing graphite and dispersible in a liquid having a relative dielectric constant of 15 or more and which can dissolve a large number of polymeric materials.

The present inventors made extensive study for solving the problem described above, and found that among solvents having a relative dielectric constant of less than 15, there is a specific solvent wherein the thin particles can be dispersed even if the proportion of the solvent in a dispersing medium is 50 wt % or more, and also that such a solvent can be used to produce dispersions having many kinds of polymeric materials dissolved therein, and the present invention was thereby completed.

That is, the present invention is as follows:

(1) A dispersion of thin particles, comprising thin particles having a skeleton consisting of carbons obtained by oxidizing graphite and dispersible in a liquid having a relative dielectric constant of 15 or more, and a dispersing medium comprising at least 50 wt % compound having a relative dielectric constant of less than 15 and soluble at a ratio of at least 50 wt % in water.

(2) A dispersion of thin particles, comprising thin particles having a skeleton consisting of carbons obtained by oxidizing graphite and dispersible in a liquid having a relative dielectric constant of 15 or more, and a dispersing medium comprising at least 50 wt % compound having a relative dielectric constant of less than 15 and compatible with water in an arbitrary ratio.

(3) The dispersion of thin particles according to the above-mentioned (1), wherein the dispersing medium is a dispersing medium comprising at least 70 wt % compound having a relative dielectric constant of less than 15 and soluble at a ratio of at least 50 wt % in water.

(4) The dispersion of thin particles according to the above-mentioned (1), wherein the dispersing medium is a dispersing medium comprising at least 90 wt % compound having a relative dielectric constant of less than 15 and soluble at a ratio of at least 50 wt % in water.

(5) The dispersion of thin particles according to the above-mentioned (1), wherein the thin particles have a thickness of 0.4 nm to 100 nm and a size of 20 nm or more in the plane direction.

(6) The dispersion of thin particles according to the above-mentioned (1), wherein the thin particles have a thickness of 0.4 nm to 10 nm and a size of 1000 nm or more in the plane direction.

(7) The dispersion of thin particles according to the above-mentioned (1), wherein the thin particles have a thickness of 0.4 nm to 5 nm and a size of 10000 nm or more in the plane direction.

(8) The dispersion of thin particles according to the above-mentioned (2), wherein the compound having a relative dielectric constant of less than 15 and compatible with water in an arbitrary ratio is a compound having an ether linkage, a heterocyclic compound, an amine compound, or a derivative thereof.

(9) The dispersion of thin particles according to the above-mentioned (2), wherein the compound having a relative dielectric constant of less than 15 and compatible with water in an arbitrary ratio is at least one member selected from the group consisting of tetrahydrofuran, dioxane, 1,2-dimethoxyethane, 2-butoxyethanol, pyridine, tetrahydrofurfuryl alcohol, ethylenediamine, diethylenetriamine and α-picoline.

(10) A dispersion of thin particles and a polymeric material, comprising thin particles having a skeleton consisting of carbons obtained by oxidizing graphite and dispersible in a liquid having a relative dielectric constant of 15 or more, a polymeric material, and a dispersing medium comprising at least 50 wt % compound having a relative dielectric constant of less than 15 and soluble at a ratio of at least 50 wt % in water.

(11) The dispersion of thin particles and a polymeric material according to the above-mentioned (10), wherein the polymeric material is polycarbonate resin, polystyrene resin or polymethyl methacrylate resin.

(12) The dispersion of thin particles and a polymeric material according to the above-mentioned (10), which is obtained by compounding a polymeric material with the dispersion of thin particles according to the above-mentioned (1).

(13) A composite material of thin particles and a polymeric material, which is obtained by drying and removing a dispersing medium from the dispersion of thin particles and a polymeric material according to the above-mentioned (10).

Many types of polymeric materials such as polystyrene resin and polycarbonate resin can be dissolved in the dispersion of thin particles according to the present invention wherein a compound having a relative dielectric constant of less than 15 and soluble at a ratio of at least 50 wt % in water, preferably compatible with water at an arbitrary ratio, is used as the dispersing medium. As a result, a polymeric composite material having the thin particles dispersed uniformly and highly in the polymeric materials can be easily produced, and thus the dispersion of thin particles according to the present invention is very useful.

DESCRIPTION OF THE PREFERRED EMBODIMENTS

The dispersion of thin particles according to the present invention comprises thin particles having a skeleton consisting of carbons obtained by oxidizing graphite and dispersible in a liquid having a relative dielectric constant of 15 or more and a dispersing medium comprising at least 50 wt % compound having a relative dielectric constant of less than 15 and soluble at a ratio of at least 50 wt % in water. Hereinafter, the respective components are described in detail.

Thin Particles

The thin particles obtained by oxidizing graphite, used in the present invention, can be graphite oxides produced by a known Brodie method (using nitric acid and potassium chlorate), Staudenmaier method (using nitric acid, sulfuric acid and potassium chlorate), Hummers-Offeman method (using sulfuric acid, sodium nitrate and potassium permanganate) and methods disclosed in JP-A 2002-53313 and JP-A 2003-176116 by the present inventors.

For example, JP-A 2002-53313 and JP-A 2003-176116 disclose the following methods.

First, the starting material used is desirably highly crystalline graphite having a developed layer structure, more specifically graphite having a single multi-layer structure as the whole of a particle wherein the diameter of the broadest basic layer in the particle is almost equal to the diameter of the particle. Such known graphite includes, for example, natural graphite (particularly the one having good qualities), kish graphite (particularly the one produced at high temperatures), and highly oriented pyrolyzed graphite. Distended graphite wherein the distance between graphite layers has been previously increased can also be used as the starting material. It is desirable that impurities such as metallic elements in graphite are previously reduced to about 0.5% or less.

The particle diameter of graphite reflects the size of the formed thin particle in the plane direction, and may thus be selected depending on the size of thin particles to be synthesized. When the shape in the plane direction of thin particles to be formed is desired to be e.g. square, the starting material of graphite may be previously cut in a square form.

For oxidation of graphite, the known methods described above can be used, and particularly the Hummers-Offeman method (W. S. Hummers et al., J. Am. Chem. Soc., 80, 1339 (1958); U.S. Pat. No. 2,798,878 (1957)) is recommended because their oxidation proceeds easiliy. In these methods, ions in an oxidizing agent permeate into between graphite layers to form an intercalation compound. Thereafter, the intercalation compound is hydrolyzed by adding water, to form graphite oxide. In this case, the graphite is oxidized for an oxidation time of 30 minutes or more, or if possible 3 hours or more, per 10 μm of the particle diameter of graphite.

After oxidation, the graphite oxide is purified by removing an oxidizing agent remaining in the reaction solution, ions generated by decomposition of the oxidizing agent, or components derived from the ions. This purification can be carried out by washing with water or alcohol, preferably with high-purity water. Before washing with water, the graphite oxide is preferably washed sufficiently with an aqueous solution of sulfuric acid or an aqueous mixture of sulfuric acid and hydrogen peroxide. In a specific procedure of purification with washing, known means such as decantation, filtration, centrifugation, dialysis and ion exchange can be used. When the purification procedure is made difficult as purification proceeds, techniques attaining relatively high efficiency of purification, such as centrifugation, dialysis and ion exchange are preferably used, and centrifugation is particularly preferably used.

By the procedure described above, layer separation proceeds in many particles of graphite oxide. When layer separation is to be further promoted, the dispersion may be sonicated or heated (preferably 50 to 150° C.).

As the thin particles used in the present invention, the graphite oxide obtained by the above method can be preferably used.

Particularly, graphite oxides having a thickness of 0.4 nm to 100 nm, preferably 0.4 nm to 10 nm, more preferably 0.4 nm to 5 nm and a size in the plane direction of 20 nm or more, preferably 1000 nm or more, more preferably 10000 nm or more, wherein the number of layers is very small, are very useful because their reduction proceeds easily due to the thinness of the particle and there is no other material having states and properties equivalent thereto. These graphite oxides can be produced by the methods disclosed in JP-A2002-53313 and JP-A2003-176116 supra. The size of the thin particles in the plane direction is selected suitably depending on the intended use and not particularly limited, but is usually 500 μm or less.

The thickness and size of the thin particles can be measured by observation under an atomic force microscope, a transmission electron microscope etc.

Dispersing Medium

The dispersing medium used in the present invention comprises at least 50% by weight of a compound having a relative dielectric constant of less than 15 and soluble at a ratio of at least 50 wt % in water. The compound having a relative dielectric constant of less than 15 is not particularly limited insofar as it is soluble in water at a ratio of at least 50 wt % based on the total weight of water and the compound having a relative dielectric constant of less than 15, and the compound is preferably soluble in water at a ratio of at least 75 wt %, more preferably compatible with water in an arbitrary ratio.

The dispersion comprises at least 50% by weight of the compound by which the polymeric material which can be dissolved in the dispersion of thin particles of the present invention can be selected from a broader range of materials.

After synthesis of graphite oxide is finished, the dispersing medium in the dispersion is usually water, and for exchanging the dispersing medium from water to the compound having a relative dielectric constant of less than 15 and soluble at a ratio of at least 50 wt % in water, preferably compatible with water at an arbitrary ratio, there is a method of diluting the original dispersion with the compound in a sufficiently larger amount than water contained in the dispersion, or a method of exchanging the dispersing medium gradually with the compound by repeatedly conducting addition of the solvent and subsequent removal of a supernatant by centrifugation and decantation.

The compound having a relative dielectric constant of less than 15 and soluble at a ratio of at least 50 wt % in water, preferably compatible with water at an arbitrary ratio is preferably a compound having an ether linkage, a heterocyclic compound, an amine compound, or a derivative thereof.

The compound having an ether linkage includes, for example, tetrahydrofuran (relative dielectric constant 7.58), tetrahydrofurfuryl alcohol (relative dielectric constant 13.61), dioxane (relative dielectric constant 2.2), 1,2-dimethoxyethane (relative dielectric constant 5.5), 2-butoxyethanol (relative dielectric constant 9.30) etc. In particular, tetrahydrofuran, dioxane and 1,2-dimethoxyethane are used for the following reasons.

Tetrahydrofuran solubilizes many resins such as polyisobutylene, polystyrene, ABS resin, polymethyl methacrylate, polyvinyl acetate, polyvinyl chloride, polyvinyl butyrate, polyvinyl ether, SBR, NBR, natural rubber, chlorinated rubber, acetyl cellulose, nitrocellulose, ethyl cellulose, benzyl cellulose, melamine, urea resin, phenol resin, alkyd resin, polyester resin, rosin, shellac, coumarone-indene resin, ester rubber, polyurethane, epoxy resin (before vulcanization), soft polyamide resin and polycarbonate.

Dioxane (relative dielectric constant 2.2) solubilizes many resins such as gum rosin, dammar dewaxing, elemi, kauri copal, guaiacum resin, Manila resin, Congo copal, mastic, pontiac, sandarac resin, shellac, ester rubber, acetyl cellulose, nitrocellulose, cellulose butyl acetate, ethyl cellulose, benzyl cellulose, vinyl chloride-vinyl acetate polymer, coumaron resin, chlorinated rubber, polystyrene, polymethyl methacrylate and polyvinyl acetate.

1,2-Dimethoxyethane (relative dielectric constant 5.5) solubilizes many resins such as acryl ester, ethyl cellulose, acetyl cellulose, nitrocellulose, methyl methacrylate, epoxy resin, vinyl carbazone and phenol-furfural resin.

Accordingly, tetrahydrofuran, dioxane and 1,2-dimethoxyethane solubilize many polymeric materials and are thus very important (see, for example, "Yozai Handbook" (Solvent Handbook), 4th ed., 1982, Kodansha).

The heterocyclic compound includes pyridine (relative dielectric constant 12.3) and α-picoline (relative dielectric constant 9.46).

The amine compound includes ethylenediamine (relative dielectric constant 12.9) and diethylenetriamine (relative dielectric constant 12.62).

The compounds having a relative dielectric constant of less than 15 and soluble at a ratio of at least 50 wt % in water may be used singly or as a mixture of two or more thereof. By suitably selecting the compound, the dispersion of thin particles according to the present invention can be prepared depending on the type of the polymeric material dissolved therein.

A highly polar, non-water liquid having a relative dielectric constant of 15 or more, such as methanol, ethanol, acetone or 2-butanone, may be contained in the dispersing medium used in the present invention.

The compound having a relative dielectric constant of less than 15 and soluble at a ratio of at least 50 wt % in water, preferably a compound having a relative dielectric constant of less than 15 and compatible with water at an arbitrary ratio, can disperse the thin particles even if the relative dielectric constant is less than 15 and the proportion of the compound in the dispersion is 50% by weight or more. This compound is contained in an amount of 50 wt % or more, desirably 70 wt % or more, more desirably 90 wt % or more in order to increase the solubility of the polymeric material, whereby a dispersion wherein the polymeric material not usable in the prior art is mixed uniformly with the thin particles can be prepared for the first time.

Dispersion of Thin Particles

The dispersion of thin particles according to the present invention comprises the thin particles described above and the dispersing medium comprising at least 50 wt % compound having a relative dielectric constant of less than 15 and soluble at a ratio of at least 50 wt % in water.

The content of the thin particles is desirably 0.0001 wt % to 20 wt %, more desirably 0.001 wt % to 10 wt %, still more desirably 0.01 wt % to 5 wt %, based on the total weight of the dispersion of the present invention.

When the content of the thin particles is too low, for example, the electrical conductivity of an electroconductive composite material produced by using the dispersion of the thin particles according to the present invention may be insufficient. On the other hand, when the content is too high, the properties of the polymeric material blended with the thin particles may be influenced.

The dispersion of thin particles according to the present invention may comprise not only the thin particles and the dispersing medium but also compounds specifically functioning as a binder, pigment, dye, adhesive component, thickener, aging inhibitor, filler, wax, softener, hardener, UV absorber, UV stabilizer, flame retardant, surface regulator and antistatic agent.

The dispersion of thin particles according to the present invention makes use of the dispersing medium comprising at least 50 wt % compound having a relative dielectric constant of less than 15 and soluble at a ratio of at least 50 wt % in water, and thus the dispersing medium can be suitably selected to dissolve many kinds of polymeric materials.

Dispersion of Thin Particles and a Polymeric Material

The dispersion of thin particles and a polymeric material is described in detail below.

The dispersion of thin particles and a polymeric material according to the present invention comprises thin particles, a polymeric material, and a dispersing medium comprising at least 50 wt % compound having a relative dielectric constant of less than 15 and soluble at a ratio of at least 50 wt % in water. The dispersion can be easily produced by compounding a polymeric material with the above-described dispersion of thin particles according to the present invention.

The polymeric material is not particularly limited insofar as it is a material generally known as a matrix material in electroconductive materials of semiconductor elements, wire materials and antistatic materials. For example, a material for example water-soluble polymers such as polyvinyl alcohol and polyethylene oxide, various kinds of thermoplastic resin and thermosetting resin, engineering plastics such as polycarbonate resin and polystyrene resin, inorganic polymers, etc. can be arbitrarily selected depending on the object.

The amount of the polymeric material blended is varied depending on the intended use, and the polymeric material can be uniformly dispersed in the range of preferably 0.01 wt % to 99.99 wt %, more preferably 0.1 wt % to 90 wt %, based on the total weight of the dispersion of the thin particles and the polymeric material according to the present invention.

According to the present invention, the polymeric material and thin particles can be uniformly dispersed in the dispersion, and thus a composite material of the thin particles and the polymeric material wherein the thin particles are uniformly dispersed can be easily obtained by drying and removing the dispersing medium.

EXAMPLES

Hereinafter, the present invention is described in more detail by reference to the Examples which however are not intended to limit the scope of the present invention.

Example 1

10 g natural graphite (purity 99.97 wt % or more) was introduced into a mixed solution consisting of 7.5 g sodium nitrate (purity 99%), 621 g sulfuric acid (purity 96%) and 45 g potassium permanganate (purity 99%), and the mixture was left at about 20° C. for days under gentle stirring. The resulting highly viscous liquid was added to 1000 cm$^3$ of 5 wt % aqueous sulfuric acid over about 1 hour under stirring, and further stirred for 2 hours. 30 g hydrogen peroxide (30 wt % aqueous solution) was added to the resulting liquid and stirred for 2 hours.

This liquid was purified by centrifugation with an aqueous mixed solution of 3 wt % sulfuric acid/0.5 wt % hydrogen peroxide and centrifugation with water to give an aqueous dispersion of thin particles. From a change in weight of a part of the dispersion before and after drying, the density of the thin particles in the dispersion was 0.5 wt %. In elemental analysis of the thin particles vacuum-dried at 40° C., the contents of oxygen and hydrogen were about 42 wt % and about 2 wt %, respectively. The thin particles were formed into a film on a copper mesh provided with a carbon microgrid and observed under a transmission electron microscope (TEM), indicating that the thickness of the thin particles was 5 nm or less, and the size thereof in the plane direction was 15 µm or more. Hereinafter, this dispersion is called Dispersion A.

Dispersion A was diluted 10-fold with tetrahydrofuran (THF) (relative dielectric constant 7.58) and centrifuged, and a supernatant was removed. The sample was diluted again 10-fold with THF and centrifuged, and a supernatant was removed. The resulting dispersion was designated Dispersion B. The ratio of THF to the total weight of the dispersing medium in Dispersion B, calculated from the water content in the dispersing medium in Dispersion B measured by the Karl-Fischer method, was 98.6 wt %. When Dispersion B was examined with naked eyes, the thin particles were uniformly dispersed in THF. The density of the thin particles in Dispersion B was 1 wt %.

Subsequently, 2 g polycarbonate resin was added to 10 g Dispersion B. As a result, a dispersion having the polycarbonate resin and thin particles dispersed uniformly therein was formed.

This dispersion was applied onto a glass substrate, and the dispersing medium was dried and removed. When the resulting coating film was observed under an optical microscope, it was confirmed that the thin particles were uniformly dispersed in the coating film of polycarbonate resin. A section of the coating film was cut off with an ultramicrotome and observed under a transmission electron microscope (TEM), and as a result, it was confirmed that the thin particles were dispersed uniformly in the film, and the thickness of 90% or more of the particles was in the range of 30 nm to 70 nm.

Example 2

Dispersion A was diluted 10-fold with dioxane (relative dielectric constant 2.2) and centrifuged, and a supernatant was removed. The sample was diluted again 10-fold with dioxane and centrifuged, and a supernatant was removed. The resulting dispersion was designated Dispersion C. The ratio of dioxane to the total weight of the dispersing medium in Dispersion C, calculated from the water content in the dispersing medium in Dispersion C measured by the Karl-Fischer method, was 98.5 wt %. When Dispersion C was examined with naked eyes, the thin particles were uniformly dispersed in dioxane. The density of the thin particles in Dispersion C was 1 wt %.

Subsequently, 0.5 g polystyrene resin was added to 10 g Dispersion C. As a result, a dispersion having the polystyrene resin and thin particles dispersed uniformly therein was formed.

This dispersion was applied onto a glass substrate, and the dispersing medium was dried and removed. When the resulting coating film was observed under an optical microscope, it was confirmed that the thin particles were uniformly dispersed in the coating film of polystyrene resin.

Example 3

Dispersion A was diluted 10-fold with 1,2-dimethoxyethane (relative dielectric constant 5.5) and centrifuged, and a supernatant was removed. The sample was diluted again 10-fold with 1,2-dimethoxyethane and centrifuged, and a supernatant was removed. The resulting dispersion was designated Dispersion D. The ratio of 1,2-dimethoxyethane to the total weight of the dispersing medium in Dispersion D, calculated from the water content in the dispersing medium in Dispersion D measured by the Karl-Fischer method, was 98.6 wt %. When Dispersion D was examined with naked eyes, the thin particles were uniformly dispersed in 1,2-dimethoxyethane. The density of the thin particles in Dispersion D was 1 wt %.

Subsequently, 0.1 g methyl methacrylate resin was added to 10 g Dispersion D. As a result, a dispersion having methyl methacrylate and thin particles dispersed uniformly therein could be formed.

This dispersion was applied onto a glass substrate, and the dispersing medium was dried and removed. When the resulting coating film was observed under an optical microscope, it was confirmed that the thin particles were uniformly dispersed in the coating film of methyl methacrylate resin.

Example 4

1 g pyridine (relative dielectric constant 12.3) was added to 1 g Dispersion A. The proportion of pyridine in the dispersing medium was about 50 wt %, but the thin particles were uniformly dispersed.

Comparative Example 1

10 g dichloromethane (relative dielectric constant 9.1; dichloromethane is dissolved in an amount of 2.00 g/100 g (20° C.) in water, and water is dissolved in an amount of 0.170 g/100 g (25° C.) in dichloromethane) was added to 1 g Dispersion A. Dispersion A containing the thin particles remained to be separated from dichloromethane, and the thin particles could not be dispersed in dichloromethane.

Comparative Example 2

10 g ethyl acetate (relative dielectric constant 6.0; ethyl acetate is dissolved in an amount of 8.08 wt % in water, and water is dissolved in an amount of 2.94 wt % in ethyl acetate) was added to 5 g Dispersion A. Dispersion A containing the thin particles remained to be separated from ethyl acetate, and the thin particles could not be dispersed in ethyl acetate.

The invention claimed is:

1. A dispersion of thin particles, comprising thin particles having a skeleton consisting of carbons obtained by oxidizing graphite and dispersible in a liquid having a relative dielectric constant of 15 or more, and a dispersing medium comprising at least 50 wt % compound having a relative dielectric constant of less than 15 and soluble at a ratio of at least 50 wt % in water, wherein the thin particles have a thickness of 0.4 nm to 100 nm and a size of 20 nm or more in the plane direction.

2. A dispersion of thin particles, comprising thin particles having a skeleton consisting of carbons obtained by oxidizing graphite and dispersible in a liquid having a relative dielectric constant of 15 or more, and a dispersing medium comprising at least 50 wt % compound having a relative dielectric constant of less than 15 and compatible with water in an arbitrary ratio, wherein the thin particles have a thickness of 0.4 nm to 100 nm and a size of 20 nm or more in the plane direction.

3. The dispersion of thin particles according to claim 1, wherein the dispersing medium is a dispersing medium comprising at least 70 wt % compound having a relative dielectric constant of less than 15 and soluble at a ratio of at least 50 wt % in water.

4. The dispersion of thin particles according to claim 1, wherein the dispersing medium is a dispersing medium comprising at least 90 wt % compound having a relative dielectric constant of less than 15 and soluble at a ratio of at least 50 wt % in water.

5. The dispersion of thin particles according to claim 1, wherein the thin particles have a thickness of 0.4 nm to 10 nm and a size of 1000 nm or more in the plane direction.

6. The dispersion of thin particles according to claim 1, wherein the thin particles have a thickness of 0.4 nm to 5 nm and a size of 10000 nm or more in the plane direction.

7. The dispersion of thin particles according to claim 2, wherein the compound having a relative dielectric constant of less than 15 and compatible with water in an arbitrary ratio is a compound having an ether linkage, a heterocyclic compound, an amine compound, or a derivative thereof.

8. The dispersion of thin particles according to claim 2, wherein the compound having a relative dielectric constant of less than 15 and compatible with water in an arbitrary ratio is at least one member selected from the group consisting of tetrahydrofuran, dioxane, 1,2-dimethoxyethane, 2-butoxyethanol, pyridine, tetrahydrofurfuryl alcohol, ethylenediamine, diethylenetriamine and α-picoline.

9. A dispersion of thin particles and a polymeric material, comprising thin particles having a skeleton consisting of carbons obtained by oxidizing graphite and dispersible in a liquid having a relative dielectric constant of 15 or more, a polymeric material, and a dispersing medium comprising at least 50 wt % compound having a relative dielectric constant of less than 15 and soluble at a ratio of at least 50 wt % in water, wherein the thin particles have a thickness of 0.4 nm to 100 nm and a size of 20 nm or more in the plane direction.

10. The dispersion of thin particles and a polymeric material according to claim 9, wherein the polymeric material is polycarbonate resin, polystyrene resin or polymethyl methacrylate resin.

11. The dispersion of thin particles and a polymeric material according to claim 9, which is obtained by compounding a polymeric material with the dispersion of thin particles according to claim 1.

12. A composite material of thin particles and a polymeric material, which is obtained by drying and removing a dispersing medium from the dispersion of thin particles and a polymeric material according to claim 9.

* * * * *